(12) United States Patent
Ohta

(10) Patent No.: US 7,417,822 B2
(45) Date of Patent: Aug. 26, 2008

(54) MAGNETIC INFORMATION MEDIUM RECORDING/REPRODUCING DEVICE

(75) Inventor: Keiji Ohta, Nagano (JP)

(73) Assignee: Nidec Sankyo Corporation (JP)

( * ) Notice: Subject to any disclaimer, the term of this patent is extended or adjusted under 35 U.S.C. 154(b) by 344 days.

(21) Appl. No.: 11/282,738

(22) Filed: Nov. 18, 2005

(65) Prior Publication Data

US 2006/0102722 A1      May 18, 2006

(30) Foreign Application Priority Data

Nov. 18, 2004   (JP)   ............................. 2004-334685
Nov. 18, 2004   (JP)   ............................. 2004-334695

(51) Int. Cl.
G11B 5/027      (2006.01)
(52) U.S. Cl. ...................................................... 360/85
(58) Field of Classification Search .................... 360/85
See application file for complete search history.

(56) References Cited

U.S. PATENT DOCUMENTS 4,748,521 A * 5/1988 Osawa et al. ................... 360/85
5,428,488 A * 6/1995 Lee ............................... 360/84
5,537,266 A * 7/1996 Yamashita et al. ............. 360/85
5,710,679 A * 1/1998 Matsuoka et al. ............. 360/85

FOREIGN PATENT DOCUMENTS

JP      06-103685      4/1994

* cited by examiner

Primary Examiner—Mark Blouin
(74) Attorney, Agent, or Firm—Cantor Colburn LLP

(57) ABSTRACT

A magnetic information medium recording/reproducing device may include a turnable drum whose outer peripheral face forms a medium feeding path for a magnetic information medium and a feeding mechanism for carrying the medium along the outer peripheral face of the drum while pressing the medium against the outer peripheral face of the drum. The drum may be formed in a hollow cylindrical shape having an inner peripheral wall and a plurality of inner support rollers are disposed for supporting the drum from the inner peripheral wall side of the drum. The drum may be held by the inner support rollers and the feeding mechanism, and one of the inner support rollers may be disposed near a magnetic head and may be urged against the inner peripheral wall of the drum.

13 Claims, 9 Drawing Sheets

PRIOR ART ic recording medium is sandwiched between the drum 102 and the feeding mechanisms 103, 104 and circulatively traveled in one direction. Reading or writing of data is successively executed from or on a magnetic recording medium which circulates around the drum 102 by a read/write head 105 which is disposed on the mid way. The feeding direction of the magnetic recording medium is appropriately changed by the operation of flappers 106, 107 disposed in the middle of the feeding path depending on the presence of a defect of recorded information on the magnetic recording medium, the requirement of writing of information or the like, and a prescribed magnetic processing is performed or the magnetic recording medium is sent out from a card eject passage 108. Further, in the case that the magnetic recording medium is abnormal, the magnetic recording medium is returned to a card insertion port 109 and ejected by reverse movement of the feeding mechanism 103, 104.

However, in a magnetic information medium recording/reproducing device shown in FIG. 9, since a solid drum is supported with only a center shaft and turned, wobbling occurs. In addition, in the solid drum structure, since the weight of the drum itself is large, the wobbling is further increased. Therefore, it is difficult that positional relationship between the magnetic recording medium traveling on the outer peripheral face of the drum and the magnetic head is maintained in a constant state and thus the writing/reading output of magnetic data becomes unstable. In order to solve the problem, drum working and bearings with a high degree of accuracy are required to restrict wobbling of the drum and thus cost is increased.

Further, in the solid drum structure, the weight of drum itself becomes large and thus its inertia is also increased. Therefore, it is difficult for the drum to be alternately repeated with forward and reverse turnings during a short time. In other words, it is difficult that reading/writing/collating etc. of information are successively processed by forwarding and returning the magnetic information medium. Therefore, these processings are required to be performed while the drum is turned in one direction and thus a processing time becomes longer because unnecessary turning is needed. In addition, since the weight of the drum itself is large, a motor with a large torque, i.e., an expensive motor is required to be used.

Further, an insert port and an eject port for a magnetic information medium are required to be disposed on an extended side in a tangential and turning direction with respect to the ring-shaped feeding path through which a magnetic information medium is circulated in one direction. Therefore, the arrangement of the insert port and the eject port and the position of flappers cannot be freely designed and thus the size of the device is increased.

Moreover, since all components such as a drive motor are required to be disposed around a solid drum, spaces for arranging these components are needed and thus the size of the device is further increased.

Further, in the case that a magnetic information medium is sandwiched and carried between the outer peripheral face of the drum and the feeding mechanisms (for example, a flat belt) as described above, since the magnetic information medium is made of a paper, it is difficult to cut the magnetic information medium in a longitudinal direction and a short-sized direction with a high degree of dimensional accuracy. Further, the dimension of the magnetic information medium may expand or contract due to humidity, and thus it is not certain that the magnetic information medium moves on the magnetic head side and the magnetic tracks of the magnetic information medium always pass through specified positions.

MAGNETIC INFORMATION MEDIUM RECORDING/REPRODUCING DEVICE

CROSS REFERENCE TO RELATED APPLICATION

The present invention claims priority under 35 U.S.C. §119 to Japanese Application No. 2004-334685 filed Nov. 18, 2004 and Japanese Application No. 2004-334695 filed Nov. 18, 2004, which are incorporated herein by reference.

FIELD OF THE INVENTION

The present invention relates to a magnetic information medium recording/reproducing device which is suitable to process a flexible magnetic recording medium. Further, the present invention relates to improvement of structure of a magnetic information medium recording/reproducing device in which a magnetic information medium is carried along the outer peripheral face of a drum.

BACKGROUND OF THE INVENTION

Some magnetic information medium recording/reproducing devices are used for reading and writing information from and on a flexible magnetic recording medium whose medium length is long. A type of flexible magnetic information media is a boarding pass for a passenger aircraft which is a paper magnetic card with a long card length. Data are read and written from and on the flexible magnetic information medium. Various data such as a departure place and a destination are recorded as magnetic information on a boarding pass. The data are read by a magnetic card reader provided at the entrance gate of an airport and new data are written if necessary. The size of a two-head type of magnetic information medium recording/reproducing device becomes larger because a feeding path corresponding to the length of a magnetic recording medium is required. On the other hand, in a type of magnetic information medium recording/reproducing device with one head for both reading and writing, a magnetic recording medium is reciprocated and thus a long processing time is required.

In order to solve the above-mentioned problems, a magnetic information medium recording/reproducing device has been proposed in which a series of information processing such as reading/writing/collation of information for a magnetic recording medium are successively processed while the magnetic information medium is sandwiched and carried between the outer peripheral face of a drum and a feeding mechanism disposed around the drum (see Japanese Patent No. 2,810,600 and Japanese Utility Model Registration No. 2,549,807).

A magnetic card reader as described above which processes a magnetic information medium is constructed, for example, as a magnetic information medium recording/reproducing device described below. In other words, this device includes a turnable drum, a feeding mechanism disposed so as to face the outer peripheral face of the drum, a magnetic head disposed to face the outer peripheral face of the drum and the like. In this device, a magnetic information medium is carried along the outer peripheral face of the drum while magnetic information is read with a magnetic head or magnetic information is newly written.

This device is constructed, as shown in FIG. 9, such that feeding mechanisms 103, 104 including flat belts are disposed around a drum 102 which is turnable around a rotation shaft 101 to form a ring-shaped feeding path where a mag- Therefore, the positional accuracy for track at the time of reading and writing operations of magnetic information is not sufficient.

Further, when it is difficult to keep the positional relationship between the drum and the magnetic head to be in a constant state, it is conceivable that the side face of the magnetic information medium is pushed by using a pressing member so as to pass through a specified position at all times. However, since the magnetic information medium is formed of paper, the paper is easily bent or its side edge is damaged with a strong pressure and thus the magnetic information medium is difficult to be carried at a constant position with respect to the magnetic head. Therefore, the output at the time of writing or reading of magnetic information is unstable.

BRIEF DESCRIPTION OF THE INVENTION

In view of the problems described above, an embodiment may advantageously provide a drum having a practical structure and its support structure. In other words, an embodiment may advantageously provide a magnetic information medium recording/reproducing device in which wobbling of the drum near a magnetic head is restricted. Further, an embodiment may advantageously provide a magnetic information medium recording/reproducing device having a drum structure with a light weight in which its forward and reverse turnings are easily changed. In addition, an embodiment may advantageously provide a compact magnetic information medium recording/reproducing device.

Further, an embodiment may advantageously provide a magnetic information medium recording/reproducing device which is capable of enhancing the positional accuracy for track and stabilizing the output of reading or writing when magnetic information is read or written while a flexible magnetic information medium is carried along the outer peripheral face of the drum.

Thus, according to an embodiment, there may be provided a magnetic information medium recording/reproducing device including a drum whose outer peripheral face forms a medium feeding path for a magnetic information medium and which is turnably supported on a frame, the drum being formed in a hollow cylindrical shape having an inner peripheral wall, a feeding mechanism which is disposed on the frame so as to face the outer peripheral face of the drum for carrying the magnetic information medium along the outer peripheral face of the drum while pressing the magnetic information medium against the outer peripheral face of the drum, a driving part which drives the feeding mechanism, a magnetic head which is disposed at a position which is capable of facing a magnetic recording part of the magnetic information medium, and a plurality of inner support rollers which are disposed for supporting the drum from the inner peripheral wall side of the drum. The drum is held by the inner support rollers and the feeding mechanism, and one of the inner support rollers is disposed near the magnetic head and is always urged against the inner peripheral wall of the drum as an urged inner support roller.

In accordance with an embodiment of the present invention, it is preferable that the remaining inner support rollers except the urged inner support roller are fixed. Further, the inner support rollers are preferably provided with at least three rollers or more. The inner support rollers except the urged inner support roller are preferably fixed at positions apart from a magnetic head. Further, it is preferable that the inner support rollers are disposed at a roughly equal interval with respect to the inner peripheral wall of the drum and the remaining inner support rollers except the urged inner support roller are fixed.

In accordance with an embodiment, it is preferable that a drive motor is disposed in the inside space of the drum.

In addition, in accordance with an embodiment, it is preferable that the magnetic information medium recording/reproducing device further includes an outer roller which is disposed on an outer peripheral side of the drum and receives an urging force of the urged inner support roller, and a pad roller which presses the magnetic recording part of the magnetic information medium to the magnetic head. Further, the urged inner support roller and the outer roller, and the magnetic head and the pad roller are respectively disposed side by side in the width direction of the magnetic information medium which is perpendicular to a feeding direction of the magnetic information medium. Further, it is preferable that the urged inner support roller and the outer roller, and the magnetic head and the pad roller are disposed side by side at the same positions in the direction perpendicular to the feeding direction of the magnetic information medium.

In accordance with an embodiment, it is preferable that a protruded part is formed on the inner peripheral wall of the drum and a plurality of the inner support rollers are formed with a groove part which fits with the protruded part. Further, it is preferable that the drum is a resin molded product More preferably, the drum may be molded by using resin material with an easily slidable property and a little flexibility.

Further, according to an embodiment, there may be provided a magnetic information medium recording/reproducing device including a turnable drum whose outer peripheral face forms a medium feeding path for a magnetic information medium, a feeding mechanism which is disposed so as to face the outer peripheral face of the drum for carrying the magnetic information medium along the outer peripheral face of the drum, a magnetic head which is disposed at a position which is capable of facing the magnetic recording part of the magnetic information medium, and a medium feeding reference surface which is a stopper provided on one side of the medium feeding path such that a side edge part in a feeding direction of the magnetic information medium contacts with the stopper and serves as a reference position for the magnetic recording part of the magnetic information medium with respect to the magnetic head. Further, the drum is relatively inclined with respect to another portion in a direction such that a space width between the drum and the feeding mechanism becomes wider or such that a pressure between the drum and the feeding mechanism becomes lower near the magnetic head so that a force toward the magnetic head side is applied to the magnetic information medium.

In the magnetic information medium recording/reproducing device, since the drum is relatively inclined with respect to another portion, a space width (pressure value) between the drum and the feeding mechanism is varied. In addition, in accordance with an embodiment, the inclination is set such that the space width between the drum and the feeding mechanism becomes wider near the magnetic head, alternatively such that the pressure is reduced near the magnetic head. Therefore, the carried magnetic information medium sandwiched between the drum and the feeding mechanism receives a force in a lateral direction depending on the difference of the space width or the pressure and thus the carried magnetic information medium is moved close to the magnetic head side. Since the medium feeding reference surface is formed on the magnetic head side, the magnetic information medium is carried in the state that the side edge part of the magnetic information medium abuts with the medium feeding reference surface.

In addition, when the magnetic information medium is moved apart from near the magnetic head, the lateral force due to the difference of the space width or the pressure between the drum and the feeding mechanism is reduced, and then an opposite lateral force to the lateral force near the magnetic head is operated at a portion on the opposite side of the drum with respect to the magnetic head. Therefore, when the magnetic information medium is carried along the outer peripheral face of the drum, the magnetic information medium alternately moves close to and moves apart from the medium feeding reference surface in the widthwise direction of the medium and thus damage of the magnetic information medium due to moving too much to the medium feeding reference surface can be prevented.

In the magnetic information medium recording/reproducing device, it is preferable that the magnetic head is inclined at the same angle as the drum so as to be in parallel with the drum. For example, in the case that the magnetic information medium is a paper medium and the inclination angle of the drum is about 1° (one degree), magnetic information can be recorded and reproduced even when the magnetic head is not inclined. However, when the magnetic head is inclined at the same angle as the drum so as to be in parallel with the drum, information recording and reproduction can be further surely performed.

In accordance with an embodiment, another magnetic head may be disposed at a point symmetrical position with respect to the magnetic head with a center position of the drum as a symmetrical center. In this case, even when an magnetic information medium is taken into the device in the reverse direction, or even when a magnetic recording part is disposed on both sides of a magnetic information medium, magnetic information of the magnetic information medium can be read or new information can be written with this another magnetic head with a high degree of accuracy.

According to an embodiment, a hollow cylindrical drum which is held from the inside and the outside with a pair of rollers and supported such that the hollow cylindrical drum is swingable with a contacting point of the rollers with the drum as a supporting point, and thus the drum passes through the same position in the near portion where the drum is held with the pair of rollers irrespective of the deviation from the circular form and the wobbling of the drum itself. Therefore, the positional relationship between the drum and the magnetic head can be maintained and thus stable writing/reading output of magnetic data can be obtained. Especially, when a drum is constructed of a resin molded product, the drum itself is capable of deforming during turning and thus the inner peripheral surface of the drum is supported with all of the inner support rollers. Therefore, the wobbling itself of the drum can be restricted. In addition, the drum formed of a resin molded product can be produced at a low cost.

In addition, the roller and the magnetic head are fixed on the same member (frame) and the medium is carried along the outer peripheral face of the drum. Therefore, the contacting pressure of the magnetic head with the medium becomes stable irrespective of the positional relationship between the magnetic head and the medium and the accuracy to the deviation from the circular form and the wobbling of the drum itself and thus a stable writing/reading output of magnetic data can be obtained.

Further, a motor can be disposed in the inner space of the drum because a hollow cylindrical drum is used. Therefore, since space saving is obtained and the weight of the drum itself is reduced and thus the inertial of the drum is reduced, a motor with a small torque, i.e., an inexpensive motor with low power consumption and low noise can be used and cost can be reduced.

Further, according to an embodiment, the magnetic information medium is carried while the side edge part of the medium comes into contact with the medium feeding reference surface near the magnetic head and thus the positional accuracy for track when magnetic information is read or written from or on the magnetic information medium is further enhanced. As a result, further stable output is obtained.

In the embodiment described above, when the magnetic head is inclined so as to be in parallel to the drum, the contacting state of the magnetic recording part with the magnetic head becomes stable and thus further stable information recording and reproduction can be performed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
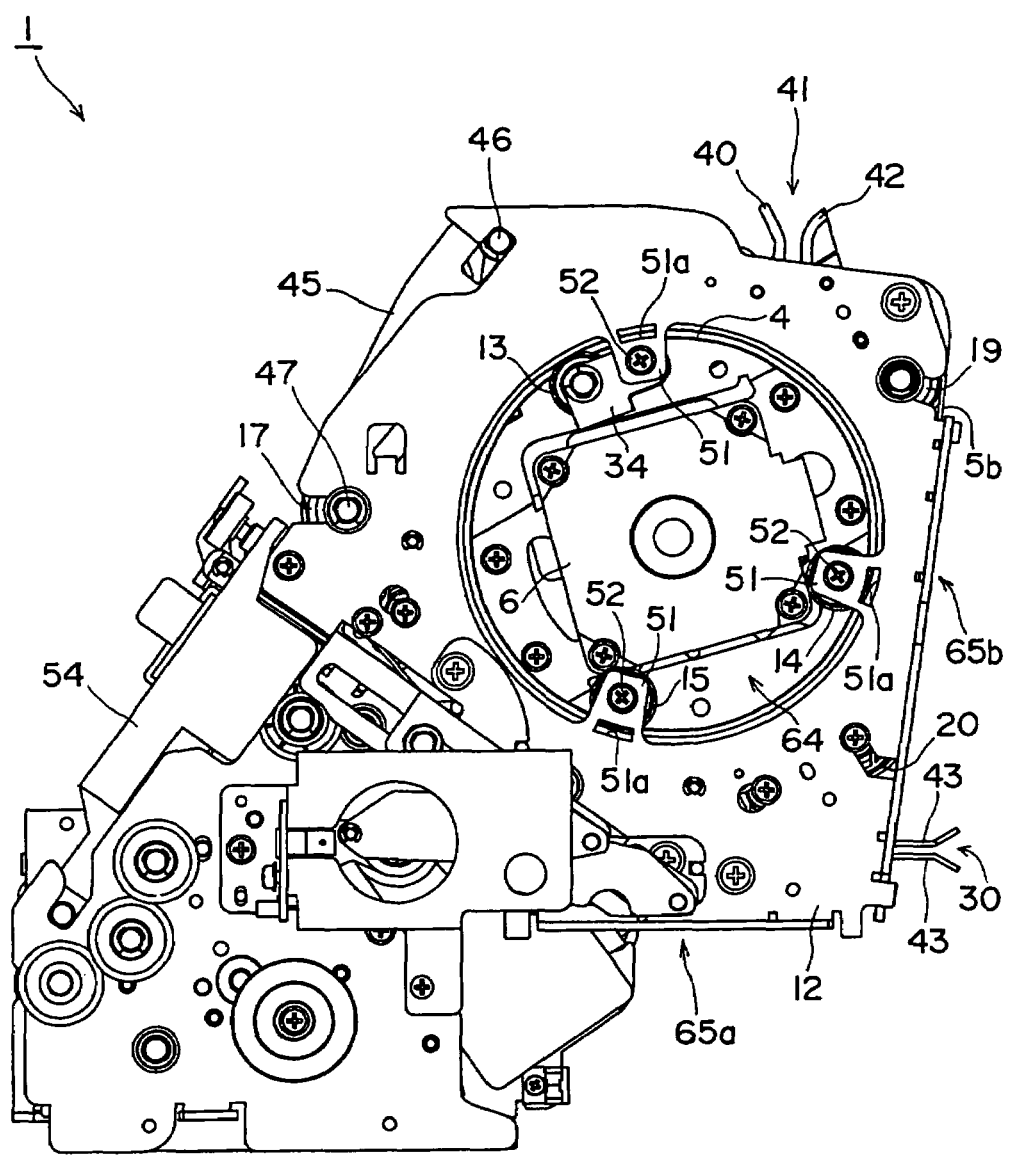
FIG. 1 is a right side view showing a magnetic information medium recording/reproducing device in accordance with an embodiment.

A magnetic information medium recording/reproducing device in accordance with an embodiment will be described in detail below with reference to the accompanying drawings.

An embodiment is shown in FIGS. 1 through 8. A magnetic information medium recording/reproducing device 1 in accordance with an embodiment includes a turnable drum 4, a feeding mechanism 5 for carrying a magnetic information medium along the outer peripheral face of the drum 4, a drive part 6 for driving the feeding mechanism 5, and a magnetic head 7 for reading or writing magnetic information. The drum 4 and the magnetic head 7 are disposed in an inclined manner such that a space width between the drum 4 and the feeding mechanism 5 is increased more on the near side of the magnetic head 7 than the far side, or such that the pressure between the drum 4 and the feeding mechanism 5 is reduced more on the near side of the magnetic head 7 than the far side.

In the magnetic information medium recording/reproducing device, the feeding mechanism 5 including flat belts is disposed around the drum 4 to form a ring-shaped medium feeding path 3 for sandwiching and feeding the magnetic recording medium between the drum 4 and the feeding mechanism 5. A series of information processing such as reading/writing/collating of information of the magnetic information medium is successively performed to the magnetic recording medium, which travels around the drum 4, by the recording and reproducing magnetic head 7 as a recording and reproducing means which is disposed on the way of the ring-shaped medium feeding path 3.

The feeding direction of the magnetic information medium 3 is appropriately changed by flappers 24, 25 disposed on the way of the medium feeding path 3 depending on defect of recorded information of the magnetic information medium 3 or necessity of information writing, and a prescribed magnetic processing is performed or the magnetic information medium 3 is ejected from a card eject passage 30.

The drum 4 whose outer peripheral face is used as the medium feeding path 3 for the magnetic information medium is not directly driven by the drive part 6 (for example, drive motor) but is turned by the friction of the feeding mechanism 5 disposed around the drum 4.

The drum 4 is a turnable body whose outer peripheral face forms the medium feeding path 3 for the magnetic information medium. For example, in an embodiment, main frames 11, 12 are respectively formed on both sides of a space in which the drum 4 is installed and the medium feeding path 3 is formed. The drum 4 is installed between the main frames 11, 12.

The main frames 11, 12 are connected with rods which form the space and are in parallel each other with a prescribed space. The space between the main frames 11, 12 is set to be a little wider than the width of the magnetic information medium so as to form a little clearance when the magnetic information medium is carried. In an embodiment, the main frame 11 is formed to be a stopper which is disposed on one side of the medium feeding path 3 so as to abut with the edge part of the magnetic information medium. In other words, the inner side face of the main frame 11 provides a medium feeding reference surface 8 which is the reference face for the magnetic recording part of the magnetic information medium with respect to the magnetic head 7.

Figure 2:
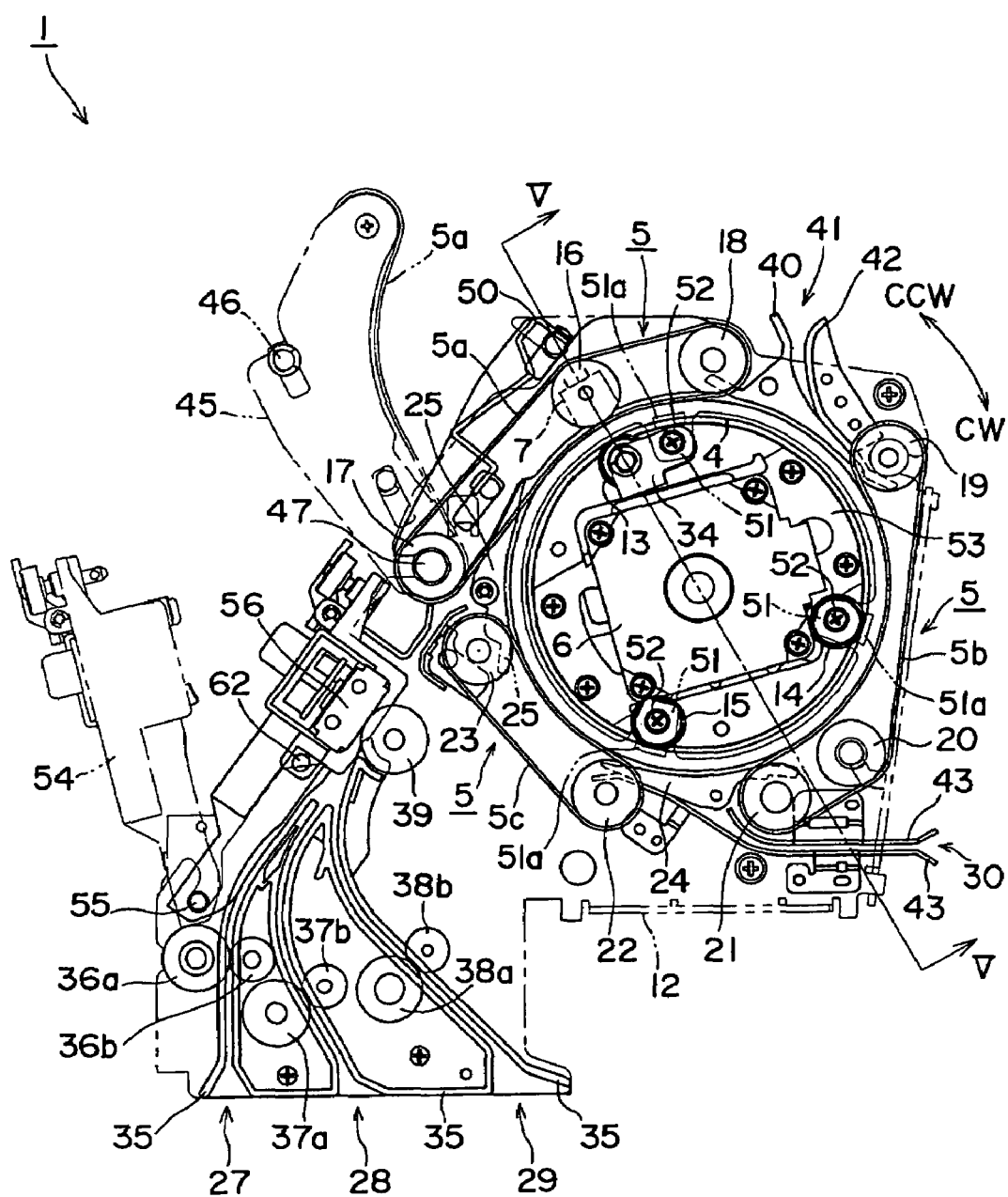
FIG. 2 is a side view showing the internal structure of the magnetic information medium recording/reproducing device shown in FIG. 1 in which the main frame on the front side of the paper surface is shown by the two-dot chain line.
Figure 3:
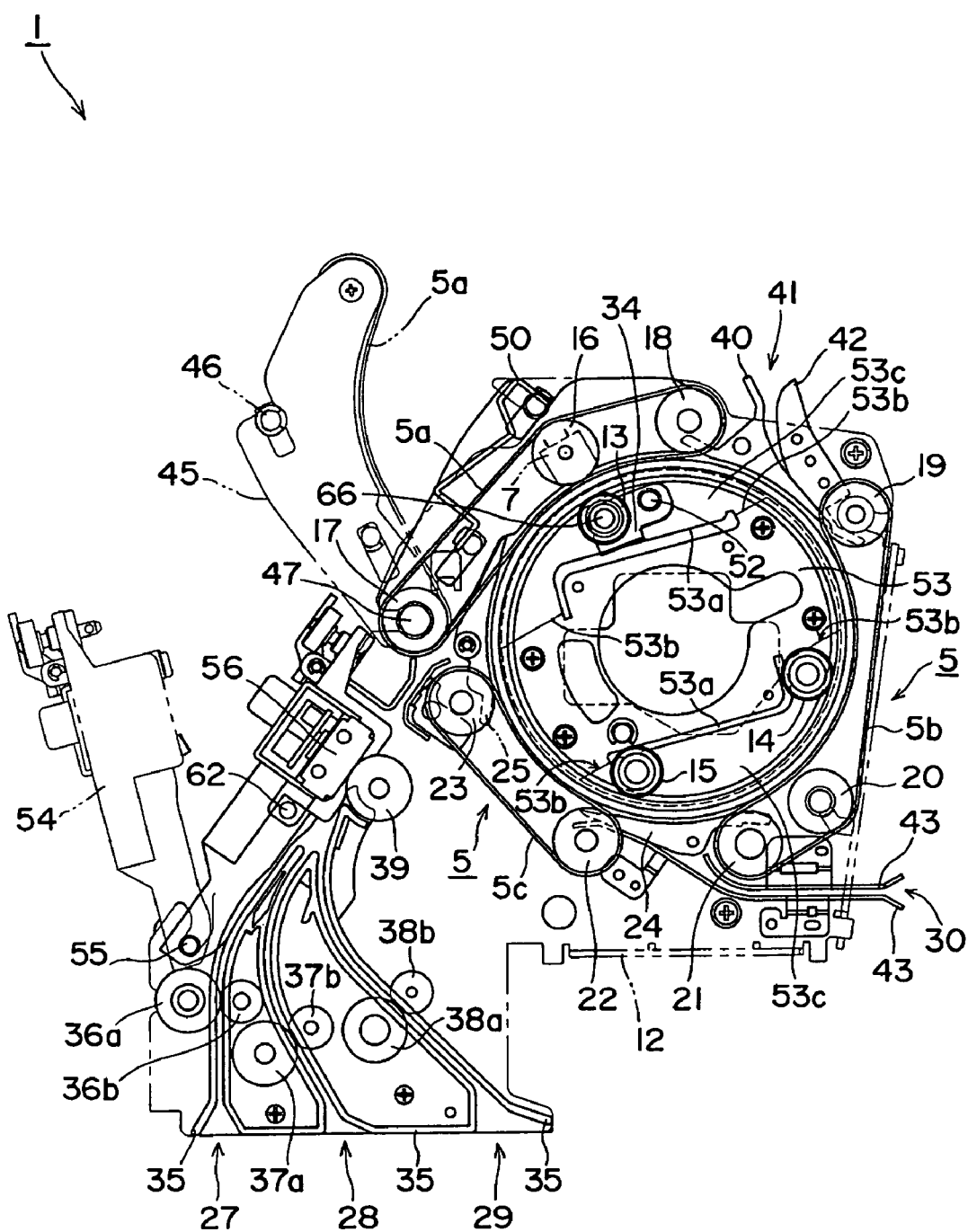
FIG. 3 is a side view showing the state where a drive part (drive motor) is detached in the magnetic information medium recording/reproducing device shown in FIG. 2.

Further, in an embodiment, a plurality of inner support rollers 13 through 15 (for example, three rollers in this embodiment) for supporting the drum 4 from the inside are disposed in the inside of the hollow drum 4 (see, FIGS. 2 and 3). For example, in an embodiment, the inner support rollers 13 through 15 are disposed in an interval of roughly 120° and each of the inside support rollers 13 through 15 is rotatably mounted on a support shaft 52.

The inner support roller 13 is disposed at a near position of the magnetic head 7 and mounted on the main frame 12 in a rotatable manner via a support arm 34. The support arm 34 is urged on the outer peripheral side of the drum 4 by a biasing means such as a coil spring which is not shown. As a result, the inner support roller 13 is always urged as a urged inner support roller toward the outer peripheral side where the magnetic head 7 is located.

An outer roller 16 constructing a part of the feeding mechanism 5 is disposed at an opposite position via the drum 4, i.e., on the outer peripheral side of the drum 4 which is opposite to the inner support roller 13. Therefore, the drum 4 is held from the inside and the outside by the urged inner support roller 13 and the outer roller 16 (see FIGS. 2, 3 and 8).

The respective support shafts 52 which support the inner support rollers 14, 15 are preferably fixed so as not to move. As constructed above, the support structure is constructed in which the drum 4 is sandwiched at only one position (near position of the magnetic head) where its wobbling is required to be restricted and, in other two positions, the drum 4 is freely moved without being restricted. When a hollow drum is used, its weight is reduced and thus its inertia can be reduced. Therefore, the downsizing of the magnetic information medium recording/reproducing device 1 and the improvement of responsibility at the time of changing the turning direction of the drum 4 can be attained.

The outer roller 16 is not required to directly face the urged inner support roller 13. The outer roller 16 may be disposed at a near position of the inner support roller 13 and the drum 4 may be constructed so as to be held by the belt of the feeding mechanism 5 and the urged inner support roller 13. In other words, the drum 4 may be supported by the feeding mechanism 5 and the urged inner support roller 13.

In an embodiment, it is preferable that a pair of the urged inner support roller 13 and the outer roller 16 and a pair of the magnetic head 7 and the pad roller 26 are disposed side by side on the same line which is perpendicular to the feeding direction of the magnetic information medium 2. However, even when they are disposed so as to be slightly shifted, a restricting effect to the wobbling is effective to the magnetic head 7. Non-slip O-rings 57 are respectively mounted on the respective inner support rollers 13, 14, 15 and the respective inner support rollers 13, 14, 15 contact with the inner peripheral face of the rotatable drum 4 through the O-rings 57.

A ring-shaped protruded part 4a protruding inside is formed at the central portion of the inner peripheral face of the drum 4. The ring-shaped protruded part 4a forms an orbital face with which the rollers 13, 14, 15 supporting the drum 4 from the inside are abutted. In order to make the wall thickness of the drum 4 approximately uniform, the corresponding outer peripheral face side of the drum 4 is formed with a recessed part 63 (annular groove) (see FIG. 5).

Orbital faces with which the belts 5a, 5b, 5c of the feeding mechanism 5 come into contact are formed across the recessed part 63 on both sides of the outer peripheral face of the drum 4. In addition, a ring-shaped rib 4b protruding toward inside is provided at the center portion of the protruded part 4a. The rib 4b is fitted with annular groove parts 13a, 14a, 15a which are respectively formed in the rollers 13, 14, 15 that support the drum 4 from the inside so as to function as a guide rail which prevents the drum 4 from chattering in an axial direction.

The annular groove parts 13a, 14a, 15a which are provided at the center portion of the respective inner support rollers 13, 14, 15 are fitted into and abutted with the annular rib 4b of the drum 4. Therefore, the drum 4 is prevented from chattering in the axial direction in a turnable state while the drum 4 is held from the inside.

The drum 4 is preferably a resin molded product which is, for example, made of polyacetal. In other words, material with a low frictional coefficient is preferably used in the drum 4 in order to slide the magnetic information medium in a lateral direction and shift toward the medium feeding reference surface 8 of the mainframe 11, and thus a resin molded product is suitable for the drum 4. Further, in order to restrict wobbling, a deformable structure such as a little harder belt is preferable than a metal drum with a high degree of rigidity that is not easily deformed. A soft drum 4 (flexible) can be turned while being deformed, and thus wobbling can be prevented by supported with all the inner support rollers 13, 14, 15. When the drum 4 is provided with a flexible property to some extent, it is preferable that wobbling is prevented by turning while being deformed.

In addition, the drum 4 is mounted so as to be rotatable both in a forward and a reverse directions and thus the drum 4 can be turned in any direction corresponding to the rotating direction of a reversibly rotatable driving part 6. In FIG. 2, the clockwise turning direction of the drum 4 is expressed as "CW" and the counterclockwise turning direction is expressed as "CCW" (see FIG. 2).

In this embodiment, three inner support rollers 13 through 15 are arranged in a roughly equal interval. However, the present invention is not limited to this embodiment and four or more inner support rollers may be arranged and implemented.

It is possible that a solid drum 4 which is formed in a not-hollow shape may be used However, in this embodiment, a hollow drum 4 is employed from the viewpoints such as the weight reduction of the drum 4 and a rapid changing of turning direction of the drum 4. The weight of the hollow drum is lighter than a solid drum and thus its inertia is reduced. Therefore, downsizing of the magnetic information medium recording/reproducing device 1 and rapid changing of the turning direction of the drum 4 can be attained.

Figure 5:
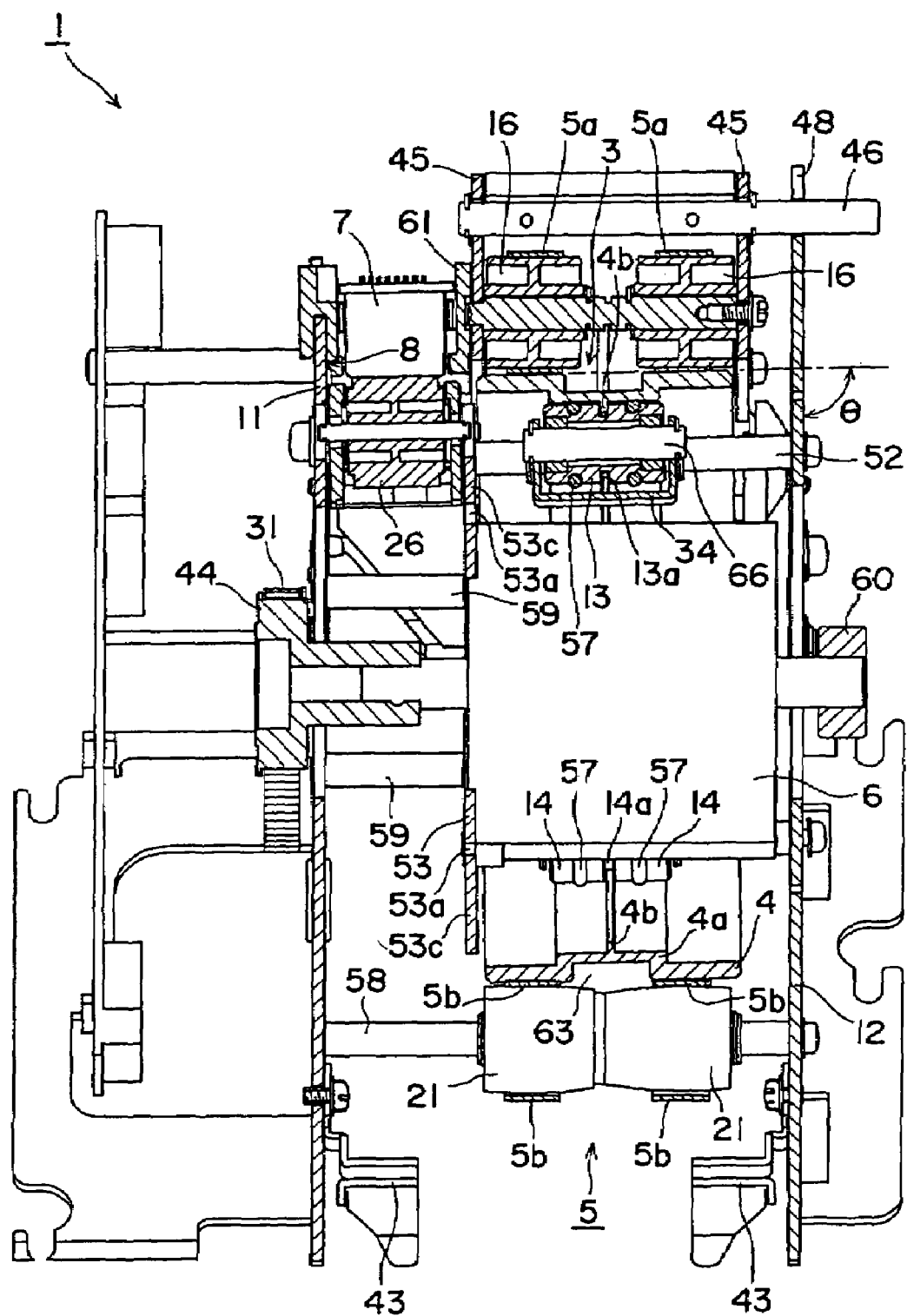
FIG. 5 is a sectional view which is cut by the line of "V-V" in FIG. 2.

As shown in FIG. 5, the respective belts 5a, 5b, 5c are disposed so as to come into contact with portions of the outer peripheral face of the drum 4 where the protruded rib 4a is not formed (see FIG. 5). Further, as shown in FIG. 5, the respective pulleys 17 through 23 and the outer rollers 16 are formed in an equal shape on the right and the left sides so as to uniformly drive a pair of right and left side belts 5a, 5b, 5c.

In an embodiment, the length of the outer peripheral face of the drum 4 is longer than the length in the feeding direction of the magnetic information medium (longitudinal length). Therefore, the drum 4 always comes into contact with and is driven by either of the respective belts 5a, 5b, 5c.

The driving part 6 is a drive source which drives the feeding mechanism 5. For example, in an embodiment, the driving part 6 is constructed with a reversibly rotatable stepping motor (drive motor 6).

The drive motor 6 as a drive source for the feeding mechanism 5 is arranged in the space which is formed inside of the hollow drum 4. The arrangement portion of the drive motor 6 is not limited to a specified position, but in this embodiment, the drive motor 6 is disposed inside of the hollow drum 4 to utilize a vacant space.

The drive motor 6 is fixed to one of the mainframes, for example, the left mainframe 11 in FIG. 5 through a motor mounting plate 53. The motor mounting plate 53 is fixed to the mainframe 11 in the state that the motor mounting plate 53 is disposed near the edge portion of the drum 4, for example, through a plurality of connecting pins 59. In an embodiment, a reversibly rotatable stepping motor is used as the drive motor 6.

A knob 60 for manually rotating a motor shaft is provided on the front side of the drive motor 6. Therefore, when the motor 6 cannot be driven by some situations, the respective feeding belts 5a, 5b, 5c can be manually turned by the knob 60.

The driving force of the drive motor 6 is transmitted to the above-mentioned pulleys and the respective belts 5a, 5b, 5c are operated. A magnetic information medium is detected by a sensor (not shown) which is disposed on the medium feeding path 3 and the rotation number of the motor is appropriately controlled with a pulse.

The magnetic head 7 is a head for reading magnetic information recorded in a magnetic recording part of the magnetic information medium or writing new magnetic information. The magnetic head 7 in accordance with an embodiment is disposed at a position capable of facing the magnetic recording part of the magnetic information medium so as to face the outer peripheral face of the drum 4 (see FIGS. 2, 3, and 5).

The rotatable pad roller 26 is mounted at a position facing the magnetic head 7 in the state that the pad roller 26 contacts with the magnetic head 7 (see FIG. 5). The pad roller 26 presses the magnetic recording part of the magnetic information medium passing between the magnetic head 7 and the pad roller 26 toward the magnetic head 7 to surely perform reading and writing of magnetic information.

Figure 4:
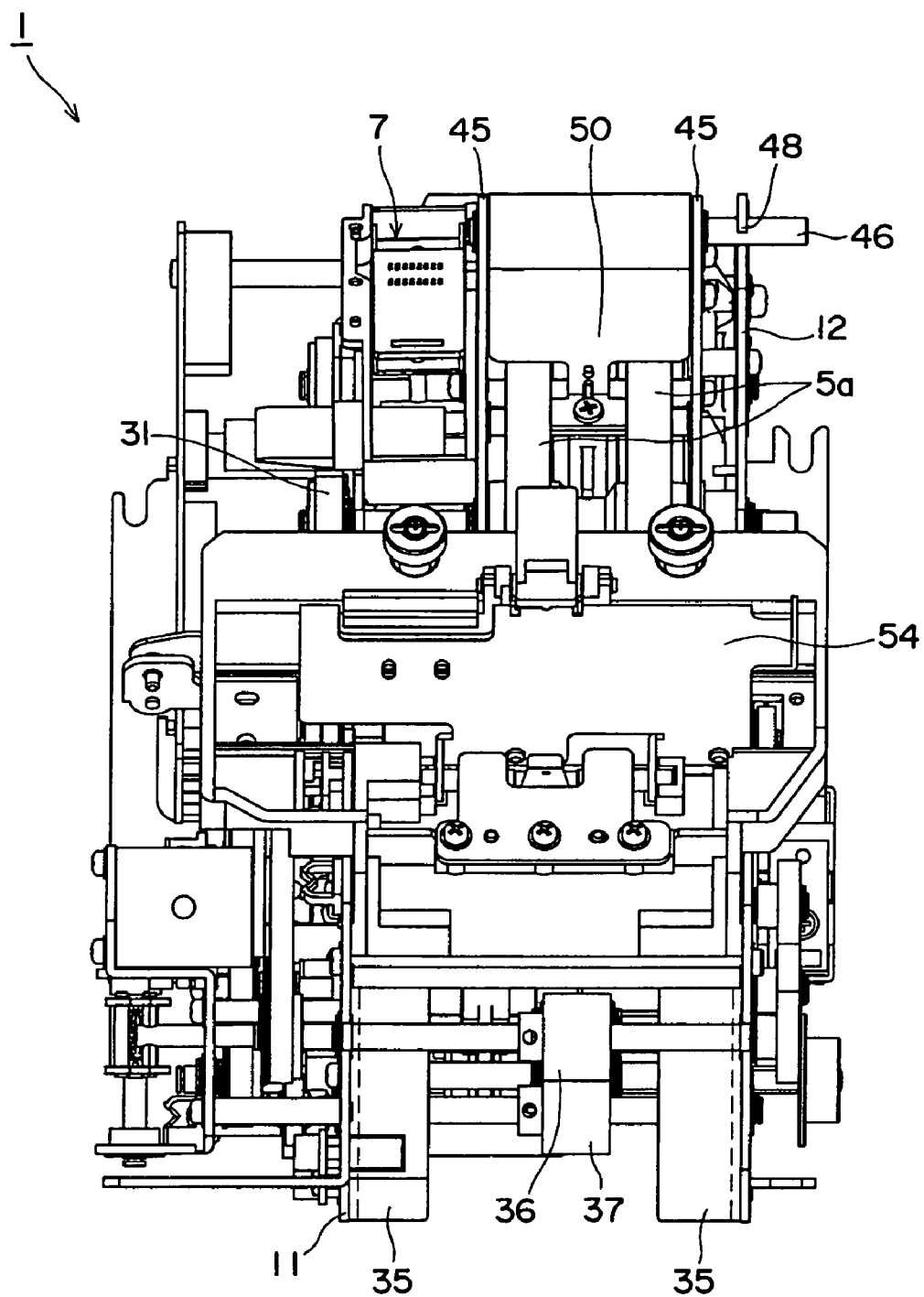
FIG. 4 is a front view showing the magnetic information medium recording/reproducing device.

The pad roller 26 and the magnetic head 7 are respectively ginbal-supported (elastically supported) on a support frame 61 which is fixed to the mainframe 11 as shown in FIG. 5. The support frame 61 is formed, for example, in a box type of frame (space is provided inside) as shown in FIG. 4.

The medium feeding reference surface 8 may be formed by using an independent member but, in an embodiment, one of right and left mainframes 11, 12 defining both sides of the medium feeding path 3 is used as the medium feeding reference surface 8. Preferably, the inner side face of the mainframe 11 which is nearer to the magnetic head 7 is utilized. When the magnetic information medium is carried in the state that the edge part of the magnetic information medium is brought into slide contact with the medium feeding reference surface 8, the magnetic recording part travels at a specified position in the widthwise direction of the medium feeding path 3 and thus positional accuracy for track is enhanced when reading or writing is performed to obtain a stable output The magnetic information medium recording/reproducing device 1 is provided with intake ports 27 through 29 for taking a magnetic information medium into the device and an outlet port 30 for feeding out the medium from the device respectively (see FIGS. 2 and 3).

The magnetic information medium recording/reproducing device 1 in accordance with an embodiment is provided with three intake ports, i.e., a first intake port 27, a second intake port 28, and a third intake port 29. Therefore, different types or categories of magnetic information medium are respectively capable of being taken in from corresponding intake ports.

As for the feeding mechanism of the magnetic information medium recording/reproducing device 1, rollers or the like for carrying the magnetic information medium are appropriately provided from the respective intake ports 27 through 29 to the outer peripheral face of the drum 4 and from the outer peripheral face of the drum 4 to the outlet port 30. The feeding mechanism of the magnetic information medium recording/reproducing device 1 in this embodiment may be constructed by using a well-known feeding mechanism and thus its detailed description is omitted.

The notational symbol "45" shows a swingable cover which can open the magnetic head 7 and its surrounding portion and the notational symbol "54" shows a swingable cover which can open a part of the medium feeding path 3 (see FIGS. 2, 3, etc.).

In addition, in the magnetic information medium recording/reproducing device 1 in accordance with an embodiment, from a viewpoint that the positional accuracy for track is further enhanced to stabilize the output when reading or writing of magnetic information is performed, the drum 4 and the magnetic head 7 are disposed in the state where they are slightly tilted with respect to the mainframes 11, 12 and the like. In other words, the drum 4 and the magnetic head 7 are slightly tilted with respect to the mainframes 11, 12 and the like such that a space between the drum 4 and the outer roller 16 at the portion near the magnetic head 7 becomes wider, or that a pressure between the drum 4 and the outer roller 16 at the portion near the magnetic head 7 becomes to be smaller (in FIG. 5, in the counterclockwise direction).

The urged inner support roller 13 functions as a guide which prevents the drum 4 from chattering in the axial direction while holding the drum 4 from the inside in the rotatable manner. The respective inner support rollers 13 through 15 are rotatably supported by the support shafts 52 which are fixed to flange portions formed at the edge portions of circular holes of the mainframes 11, 12. The support shaft 52 is tilted with a prescribed angle by the flange portion which is inclined corresponding to the inclination of the drum 4. Therefore, in an embodiment, the drum 4 and the respective inner support rollers 13, 14, 15 are disposed in a parallel manner. In other words, since the urged inner support roller 13 is arranged in the inclined manner, the drum 4 is also disposed to be inclined.

Concretely, the drum 4 is inclined in the surface which is formed by connecting the magnetic head 7 and the rotation center of the drum 4 with respect to the respective right and left mainframes 11, 12 which regulates the traveling width of the magnetic information medium. In addition, the magnetic head 7 is also inclined with respect to the mainframes 11, 12 such that the magnetic head 7 comes into contact with the inclined magnetic information medium in a parallel manner.

In the magnetic information medium recording/reproducing device 1 in accordance with an embodiment, the angle of inclination is, for example, set to be 1° (one degree). However, the angle of inclination is not limited to a specified value and may be set to be various values depending on the construction of the device or the type of magnetic information medium. A conventional rotatable drum 4 is perpendicularly mounted on the mainframe 11, 12 and thus θ=90° in FIG. 5. However, in accordance with an embodiment, the angle of inclination is 1° (one degree) as described above and thus θ=91° (see FIG. 5).

The construction for tilting the drum 4 as described above is not limited to a certain structure but it is preferable to be constructed as simple as possible. For example, the inner support rollers 13 through 15 are disposed and rotatably mounted on the mainframe 12 so as to be located at roughly equal intervals of about 120° as described above (see FIGS. 2 and 3). In this embodiment, three bracket-shaped protruded parts (bracket) 51 protruding inside are formed in the mainframe 12. The respective inner support rollers 13 through 15 are fitted to the respective support shafts 52 which are supported by the brackets 51 (see FIGS. 2 and 3). The support shafts 52 and the inner support rollers 13 through 15 are tilted by slightly bending the respective brackets 51 and, as a result, the rotatable drum 4 is also inclined. More concretely, the bracket 51 supporting the inner support roller 13 is slightly bent on the opposite side with respect to the mainframe 11 in FIG. 5 (front side direction with respect to the paper surface in FIGS. 2 and 3).

The bracket 51 supporting the inner support roller 15 is slightly bent on the mainframe 11 side in FIG. 5 (back side direction with respect to the paper surface in FIGS. 2 and 3) to be parallel to the bracket 51 supporting the inner support roller 13. In addition, the bracket 51 supporting the inner support roller 14 is slightly bent while being twisted to be parallel to the above-mentioned respective brackets 51.

According to the respectively bent brackets 51 described above, the drum 4 can be inclined at a prescribed angle (1° (one degree) in this embodiment) through the respective support shafts 52 and the respective inner support rollers 13 through 15 which are inclined with the same angle.

A through hole 51a is formed in the base part of each of the respective brackets 51 to cause to be easily bent when the bracket 51 is slightly bent (see FIG. 2). For example, in an embodiment, the through hole 51a is formed in an approximately rectangular hole which is longer in the circumferential direction. However, this is only an example and any shape may be utilized as long as the bracket 51 is easily bent In an embodiment, the opposite side of the support shaft 52 is supported by the motor mounting plate 53 and thus a part of the motor mounting plate 53 is appropriately bent (see FIG. 5). In other words, a portion of the motor mounting plate 53 which supports the upper support shaft 52 (the support shaft supporting the inner support roller 13) is slightly bent on the mainframe 12 side in FIG. 5 (back side direction with respect to the paper surface in FIG. 3).

On the other hand, portions of the motor mounting plate 53 which support the lower support shafts 52 (the support shafts supporting the inner support rollers 14, 15) are slightly bent on the opposite side with respect to the mainframe 12 in FIG. 5 (front side direction with respect to the paper surface in FIG. 3). Since all the portions are bent so as to be in parallel with the above-mentioned brackets 51, the respective support shafts 52 are perpendicularly mounted and thus their mounting workings are simple and easy.

In an embodiment, the elongated-shaped through hole and the bending line is formed in the motor mounting plate 53 (see the notational symbols "53a" and "53b" in FIGS. 3 and 6) to cause the predetermined portion of the motor mounting plate 53 to be bent easily (see FIG. 5).

A power transmission belt 31 is stretched over one of the pulleys 17 and 18, one of the pulleys 19 and 21, and one of the pulleys 22 and 23, over which the respective belts 5a, 5b, 5c are stretched, such that driving force from the driving part 6 (drive motor, for example) is simultaneously transmitted. For example, in accordance with an embodiment, the power transmission belt 31 is stretched over the pulley 44 fixed to the motor shaft of the drive motor 6, the pulley 67, the pulley 68, the pulley 69 and the idler 32. Therefore, the power of the drive motor 6 is simultaneously transmitted to the respective belts 5a, 5b, 5c through the respective pulleys 17, 19, 22 to be synchronously rotated (see FIG. 6).

The notational symbols "20" and "32" in the drawings show idlers (idle pulley), which prevents the feeding belt 5b from interfering and ensures the power transmission belt 31 to be wound sufficiently around the drive pulley 44.

The first feeding belt 5a is supported by the frame 45 including a pair of plates which is swingable around a shaft 47 penetrating through the right and left mainframes 11, 12. The frame 45 is swung around the shaft 47 to move away from the drum 4 and the rotatable drum 4 can be exposed. This structure enables a magnetic information medium to be easily taken out when the magnetic information medium occurs jamming just after being taken in.

The pulleys 17, 18 and the outer pulley 16 are rotatably supported on the frame 45. The pulleys 17, 18, the outer pulley 16 and the feeding belt 5a which is stretched over them are integrated through the frame 45 and move as one block The frame 45 is provided with a connecting pin 46 which is slidable in a slot 49. The frame 45 is clamped at a prescribed position with respect to the drum 4 by the connecting pin 46 which is engaged with a pawl 48 formed on the mainframe 12 side. The connecting pin 46 is engaged by a cover 50 which is capable of sliding in the same direction and disengaged from the pawl 48 by sliding operation of the cover 50.

In an embodiment, the magnetic head 7 and the rotatable drum 4 are disposed side by side between the right and left mainframes 11, 12. In other words, the space between the right and left mainframes 11, 12 is the width of the medium feeding path 3 where a magnetic information medium passes. The width of the medium feeding path 3 is set to be slightly wider than that of the magnetic information medium and thus a little clearance is generated when the magnetic information medium is carried. These mainframes 11, 12 are connected to each other through rods serving as a spacer therebetween as described above and face each other with a prescribed space.

An import passage frame 35, a discard passage frame 42 and an eject passage frame 43 for a magnetic information medium are respectively fixed with a screw or the like on the inner side faces of the mainframes 11, 12, which support both side edge parts of the magnetic information medium to form the feeding path. First taking-in rollers 36a, 36b, second taking-in rollers 37a, 37b and third taking-in rollers 38a, 38b for holding and feeding a magnetic information medium are respectively disposed in a space of the import passage frame 35, i.e., in a center space between the mainframes 11, 12. These rollers 36a, 36b, 37a, 37b, 38a, 38b are driven by other belts driven by the drive motor 6. Another taking-in roller 39 is provided on the back side of these rollers 36a, 36b, 37a, 37b, 38a, 38b. In accordance with an embodiment, the medium feeding path 3 for a magnetic information medium is constructed by the drum 4 and the feeding mechanism 5 comprising a plurality of feeding belts disposed around the drum 4.

Concretely, in the magnetic information medium recording/reproducing device, a first intake port 27 through a third intake port 29 for taking a magnetic information medium 2 into the device, an eject port 30 for feeding the medium 2 out of the device, and a preliminary port 41 which is used as a taking-in port or an eject port as required (for example, when device mounting surfaces 65a, 65b are modified) are respectively formed by the import passage frame 35, the preliminary taking-in/eject passage frame 42 and the eject passage frame 43.

In accordance with an embodiment, the first intake port 27, the second intake port 28 and the third intake port 29 are provided such that different types or categories of magnetic information medium is capable of being taken in from a corresponding intake port. The respective frames 35, 42 and 43 are fixed with a screw or the like on the right and left mainframes 11, 12 comprising one set of two plate members which are disposed with a prescribed space so as to interpose both side edge parts of the magnetic information medium. The preliminary port 41 is normally closed by the flapper 40 which is moved in a separating direction from the rotatable drum 4 and fixed with a screw or the like. In this state, the flapper 40 constructs a part of the feeding path around the drum 4.

The notational symbol "54" in the drawing is a frame which supports an optical scanner 56 for optically reading a magnetic information medium immediately before being taken in to the medium feeding path 3. The frame 54 is swingable around a shaft 55 which penetrates through the mainframes 11, 12 such that the import passage may be opened. The optical scanner 56 is constructed to be swingable around a shaft 62 so as to be opened or closed.

As described above, according to the magnetic information medium recording/reproducing device 1 in an embodiment in which the drum 4 and the magnetic head 7 are tilted, the following operations are performed for a magnetic information medium. In other words, parts of the motor mounting plate 53 for supporting the drum 4, the brackets 51 and the support shafts 52 are inclined and thus the drum 4 is slightly tilted with respect to the mainframes 11, 12. As a result, difference of space width is generated between the drum 4 and the two outer rollers 16 or difference of pressure is generated between them. In other words, the medium feeding path 3 near the magnetic head 7 is formed such that the space width near the mainframe 12 of the medium feeding path 3 is formed slightly narrower than that near the mainframe 11 (see FIG. 5).

The magnetic information medium carried in the medium feeding path 3 where the difference of space width or pressure is present receives a lateral force directing from a narrow side to a wide side (or directing from a high pressure side to a low pressure side). Therefore, the magnetic information medium is moved close to the mainframe 11 and carried while the side edge part of the magnetic information medium is brought into contact with the medium feeding reference surface 8. As a result, the positional accuracy for track at the time of reading or writing magnetic information of the magnetic information medium is further enhanced and further stable output is obtained.

On the opposite side of the magnetic head 7 with respect to the rotatable drum 4, the medium feeding path 3 is formed such that the space width near the mainframe 12 of the medium feeding path 3 is formed slightly wider than that near the mainframe 11 which is opposite to the above-mentioned case. Therefore, the magnetic information medium is moved close to the mainframe 12. Accordingly, when the magnetic information medium is carried along the feeding path 3, the magnetic information medium is moved close to or apart from the mainframes 11 and 12 alternately at the near portion of the magnetic head 7 and the opposite side portion of the drum 4. Therefore, the damage of the side edge part of the magnetic information medium due to too much moving toward one of the mainframes is prevented.

The operation of the magnetic information medium recording/reproducing device 1 will be described below. When the drive motor 6 is operated, the belts 5a, 5b, 5c are respectively turned through the power transmission belt 31, the respective pulleys 67, 68, 69, and the respective pulleys 17, 19, 22. The drum 4 contacting with the belts 5a, 5b, 5c is also turned.

The magnetic information medium which is taken into the device from the intake ports 27 through 29 is traveled together with the drum 4 in the state that the medium is sandwiched between the drum 4 and the belts 5a, 5b, 5c. The magnetic information medium passes through the portion of the magnetic head 7 and magnetic information is written in the magnetic recording part of the medium at this time. When the writing of the magnetic information is finished, the driving part 6 stops its rotation and then is turned in a reverse direction to turn the drum 4 in the "CCW" direction (see FIGS. 2 and 3). When the magnetic information medium which is carried in the "CCW" direction passes through the magnetic head 7, the verify reading of the magnetic information (reading operation for the verification of information) is performed. In this case, the flapper 24 is changed to a separated position from the drum 4 to guide the magnetic information medium which is carried in the "CCW" direction to the outlet port 30.

According to the magnetic information medium recording/reproducing device constructed as described above, the positional relationship between the magnetic recording part of the magnetic information medium and the magnetic head 7 is maintained in a constant state and thus writing/reading output of magnetic data can be stabilized.

Next, a concrete application example of the magnetic information medium recording/reproducing device 1 which is operated as described above will be described below. For example, in this application example, a continuous ticket sheet which is connected with perforation and formed in the state where a large number of magnetic information media is folded in the shape of bellows is taken in from either of the intake ports 27 through 29 and processed.

First, when the insertion of a magnetic information medium is detected with a sensor not shown in the drawing (for example, the sensor is provided near the inserting port of the roller 39), the drive motor 6 is operated. When the drive motor 6 is operated, the respective drive pulleys 17, 19, 22 and the feeding belts 5*a*, 5*b*, 5*c* which are stretched over the respective drive pulleys 17, 19, 22 of the three feeding mechanisms 5 are respectively turned through the power transmission belt 31. Therefore, the drum 4 contacting with the belts 5*a*, 5*b*, 5*c* is also turned.

When a first magnetic information medium of continuous ticket sheet is taken into the medium feeding path 3 by the feeding belt 5*a*, pre-reading is performed. In the case that information such as the sort of ticket or a serial number has been recorded previously in the magnetic information medium, the information is read and discriminated. When the magnetic information medium is genuine, the first magnetic information medium of the continuous ticket sheet is separated at the perforated portion by a cutter 33 and taken in as one piece of magnetic ticket The cutter 33 is mounted so as to be linearly movable and the blade of the cutter 33 is capable of cutting the continuous ticket sheet (see FIGS. 2 and 3).

In the magnetic information medium recording/reproducing device 1 in an embodiment, the drum 4 is mounted in the slightly inclined state. Therefore, different frictional forces are applied to the magnetic information medium between the feeding belt 5*a* which is disposed horizontally and the drum 4. In other words, frictional force is larger near the mainframe 12 and frictional force is smaller near the mainframe 11. As a result, force in a side direction which urges toward the medium feeding reference surface 8 provided on the inner side face of the mainframe 11 is applied to the magnetic information medium. Therefore, the magnetic information medium which is sandwiched between the drum 4 and the feeding belt 5*a* passes near the magnetic head 7 in the state that its side edge part is pressed against the medium feeding reference surface 8. As a result, when reading or writing of magnetic information from or in the magnetic information medium is performed, a high degree of positional accuracy for track is attained and thus a stable output can be obtained.

In the magnetic information medium recording/reproducing device 1 in accordance with an embodiment, the length of the outer peripheral face of the drum 4 is longer than that of a magnetic information medium (length in the feeding direction) and thus the drum 4 always comes into contact with either of the feeding belts 5*a*, 5*b*, 5*c* so as to be turned. In this embodiment, the drum 4 is supported and turned by the inner support rollers 13, 14, 15 and the feeding belts 5*a*, 5*b*, 5*c*. In this case, the drum 4 is held by a pair of the rollers 13, 16 from the inside and the outside and is supported so as to be swingable with the contacting point of the rollers 13, 16 and the outer peripheral face of the drum 4 as a supporting point with respect to the remaining fixed inner support rollers 14, 15. Therefore, the drum 4 is capable of passing through the same position near the point where the drum 4 is held by the rollers 13, 16 irrespective of the deviation from circular form and the wobbling of the drum 4 itself.

Especially, in the case that the drum 4 is constructed of a flexible resin molded product, since the rotatable drum 4 itself can deform during turning, the inner peripheral surface of the drum 4 is supported by all the inner support rollers 13, 14, 15 and thus the wobbling of the drum 4 is restricted. Therefore, the positional relationship between the drum 4 and the magnetic head can be maintained in a constant state and thus a stable writing/reading output of magnetic data is obtained.

As described above, a magnetic ticket/magnetic paper card (magnetic information medium) which is separated by the cutter 33 is turned along the outer peripheral face of the drum 4 in the "CW" direction by one revolution and necessary information is written during passing through the magnetic head 7. When completion of writing is detected with a sensor not shown (magnetic information medium is reached to a predetermined position), the drive motor 6 is stopped and then turned in the reverse direction (drum 4 is reversely turned) to carry the magnetic information medium in the "CCW" direction. The magnetic information medium is passed through the magnetic head 7 in the reverse direction again and a verify reading is performed to collate the written contents. When collation result exhibits no problems, the position of the flapper 24 is changed and the magnetic information medium is ejected from the outlet port 30 (see FIGS. 2 and 3). Alternatively, when collation result exhibits a problem, the position of the flapper 40 for discard is changed without changing the position of the flapper 24 and the magnetic information medium is traveled along the drum 4 to be discarded from the discard passage 41.

The present invention has been described in detail using the embodiments, but the present invention is not limited to the embodiments described above and many modifications can be made without departing from the present invention. For example, in the embodiment, reading or writing is performed on a flexible magnetic information medium such as an airline ticket by the magnetic head 7. However, the present invention is not limited to this embodiment and is applicable to an inspection device for a flexible medium such as a check or a postcard.

Further, the present invention may be applied to a device which is, for example, provided with an optical scanner or a bar code reader as an information reading means. In other words, even when either of magnetism, image, bar-code and the like is read or written, the present invention may be applied to a device performing necessary information processing such as reading/writing/collation of recording information while an information recording medium is traveled along the ring-shaped medium feeding path 3 which is formed by utilizing the outer peripheral face of the drum 4. In this case, wobbling near the information reading means is restricted. Further, a drive motor with a low torque is sufficiently used and its forward/reverse rotations can be easily changed and a compact structure can be obtained. Further, the present invention may be applied to an equipment which is constructed such that a magnetic information medium is passed through a predetermined position along a certain reference surface to enhance the positional accuracy for track and to obtain a stable output.

Further, at the portion on the outer peripheral face of the drum 4 where is opposite to the magnetic head 7 with respect to the drum 4 (near the portion of the pulleys 20, 21 in FIGS. 2 and 3), the carried magnetic information medium may move close on the mainframe 12 side and contact on the surface of the mainframe 12. Therefore, in order to utilize this situation, another magnetic head 7 may be provided on the mainframe 12.

In this case, a pair of magnetic heads is disposed across the center position of the drum 4 in a symmetrical manner and thus a device can be constructed which is capable of reading and writing of information regardless of the direction at the time of taking in of the magnetic information medium. In other words, when the magnetic information medium is taken into a device in a normal direction, reading (writing) is performed with the magnetic head 7 during traveling along the medium feeding reference surface 8 as described in the above-mentioned embodiment. On the other hand, when the magnetic information medium is reversely taken in, reading (writing) is performed with the above-mentioned another magnetic head while the edge part of the carried magnetic information medium contacts with the mainframe 12. Therefore, both cases can be coped by the construction described above.

In accordance with an embodiment, the drum 4 is slightly tilted by means of that a part of the motor mounting plate 53, the brackets 51 and the support shafts 52 are inclined. However, this construction is only one embodiment to cause a magnetic information medium being carried to shift in a side direction. In other words, as described above, in the magnetic information medium recording/reproducing device 1, the space between the drum 4 and the feeding mechanism 5 near the magnetic head 7 is constructed so as to be gradually wider as it approaches to the medium feeding reference surface 8. Alternatively, the pressure between the drum 4 and the feeding mechanism 5 near the magnetic head 7 is constructed so as to be gradually lower as it approaches to the medium feeding reference surface 8. In these cases, the magnetic information medium can be moved in the lateral direction or moved closer to the medium feeding reference surface 8. The space (pressure) between the drum 4 and the feeding mechanism 5 is only required to be relatively wider (or lower) and the present invention is not limited to the above-mentioned embodiment.

For example, even in a device in which part of the motor mounting plate 53, the brackets 51, the support shafts 52 and the drum 4 are kept in a horizontal state without being inclined and another member, e.g., the feeding mechanism 5 is slightly tilted, similar effects as the device of the above-mentioned embodiment can be obtained.

In accordance with an embodiment, the drum 4 and the magnetic head 7 are inclined. However, this is only an example of a preferred embodiment of the magnetic information medium recording/reproducing device 1 and the present invention is not limited to this embodiment. In other words, in the magnetic information medium recording/reproducing device 1 in this embodiment, from a viewpoint of surely performing recording and reproduction of information, it is preferable that the magnetic head 7 is tilted at the same angle as the drum 4 to be in parallel to the drum 4 and thus the angle of inclination of the magnetic head 7 with respect to the magnetic recording part of the magnetic information medium is set to be zero. However, for example, in the case that a magnetic information medium is a paper medium and the angle of inclination of the drum 4 is about 1° (roughly one degree) like this embodiment, magnetic information can be recorded or reproduced even when the angle of inclination of the magnetic head 7 with respect to the magnetic recording part is not zero, in other words, the angle of inclination of the magnetic head 7 with respect to the magnetic recording part is about 1° (roughly one degree).

Especially, in the case that the pad roller 26 and the magnetic head 7 are gimbal-supported (elastically supported) like this embodiment, the magnetic head 7 with the inclination angle of zero is capable of facing the magnetic information medium. Therefore, even when the magnetic head 7 is not tilted in advance, magnetic recording and reproduction can be sufficiently performed.

In accordance with an embodiment, the inner support rollers 13, 14, 15 are respectively supported between the motor mounting plate 53 and the mainframe 12 with the support shafts 52 which are fixed to the motor mounting plate 53 and the mainframe 12. The portions of the motor mounting plate 53 and the mainframe 12 to which the support shafts 52 are fixed are respectively bent so as to be slightly inclined (about 1° (one degree) in this embodiment) with respect to the mainframe 12 perpendicular to the device mounting surface. Therefore, the respective inner support rollers 13, 14, 15 and thus the drum 4 which is supported by the respective inner support rollers 13, 14, 15 are slightly tilted.

In other words, three protruded parts 51 (bracket) for supporting roller which are protruded toward inside of the circular opening part 64 for mounting are formed in the mainframe 12. These brackets 51 are respectively bent at their base portions in an appropriate manner.

For example, the bracket 51 supporting the urged inner support roller 13 is slightly bent on the opposite side with respect to the mainframe 11, i.e., toward the outside of the device (front side direction with respect to the paper surface in FIGS. 2 and 3). Further, the respective brackets 51 supporting the inner support rollers 14, 15 are slightly bent on the mainframe 11 side in FIG. 5, i.e., toward the inside of the device (back side direction with respect to the paper surface in FIGS. 2 and 3) to be in parallel to the bracket 51 which supports the inner support roller 13.

The portions 53c of the motor mounting plate 53 to which the opposite sides of the support shafts 52 are fitted and supported are slightly bent on the opposite side of the corresponding brackets 51 (see FIG. 5). The respective support shafts 52 are supported between the portions 53c of the motor mounting plate 53 and the corresponding brackets 51 so as to be in parallel to each other and slightly inclined with respect to the mainframes 11, 12. In other words, the portion 53c of the motor mounting plate 53 for mounting the upper support shaft 52 (support shaft for supporting the inner support roller 13) is slightly bent on the mainframe 12 side in FIG. 5 (back side direction with respect to the paper surface in FIG. 6).

Figure 6:
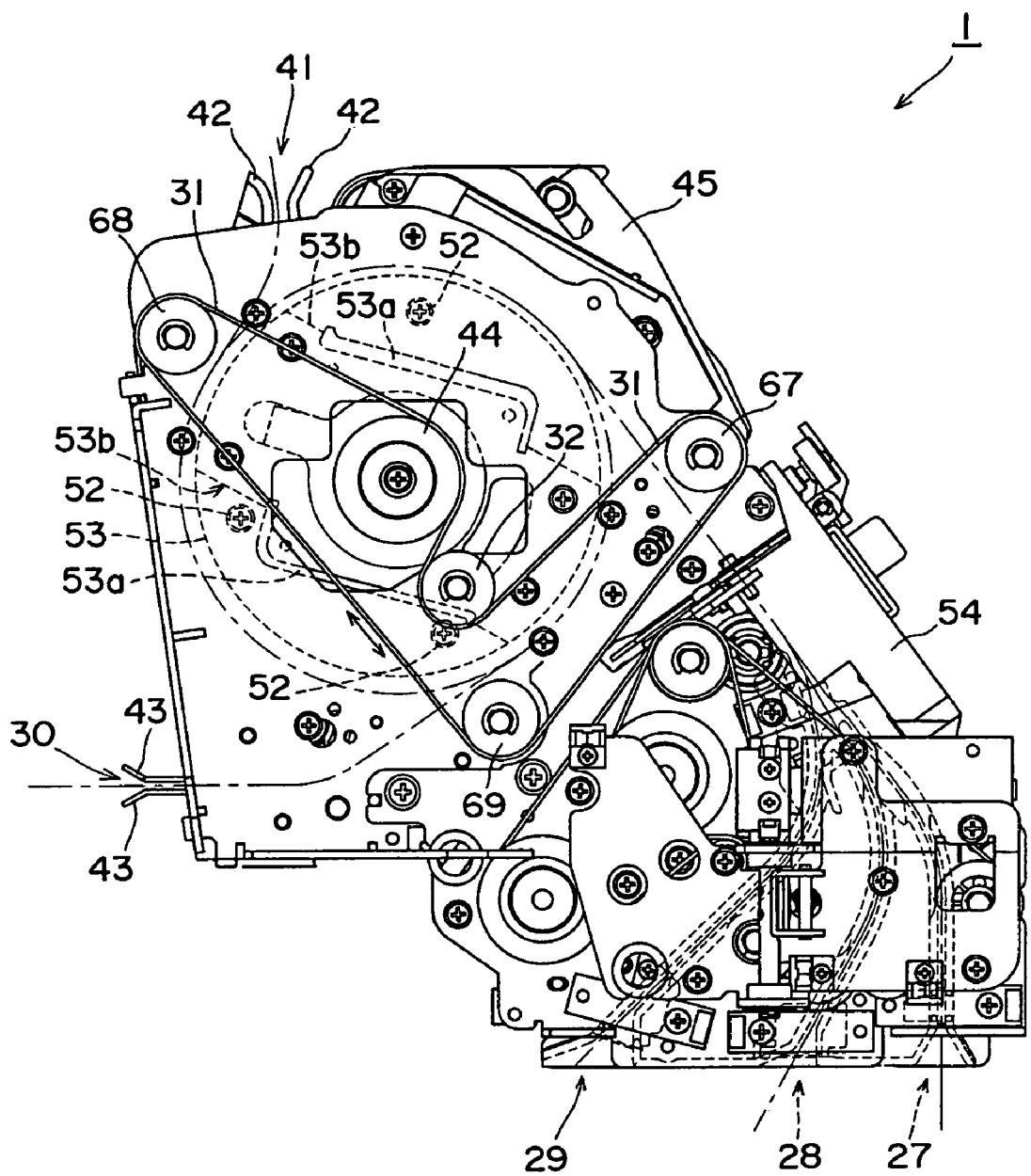
FIG. 6 is a left side view showing the state where a wiring circuit board is detached from the magnetic information medium recording/reproducing device.
Figure 7:
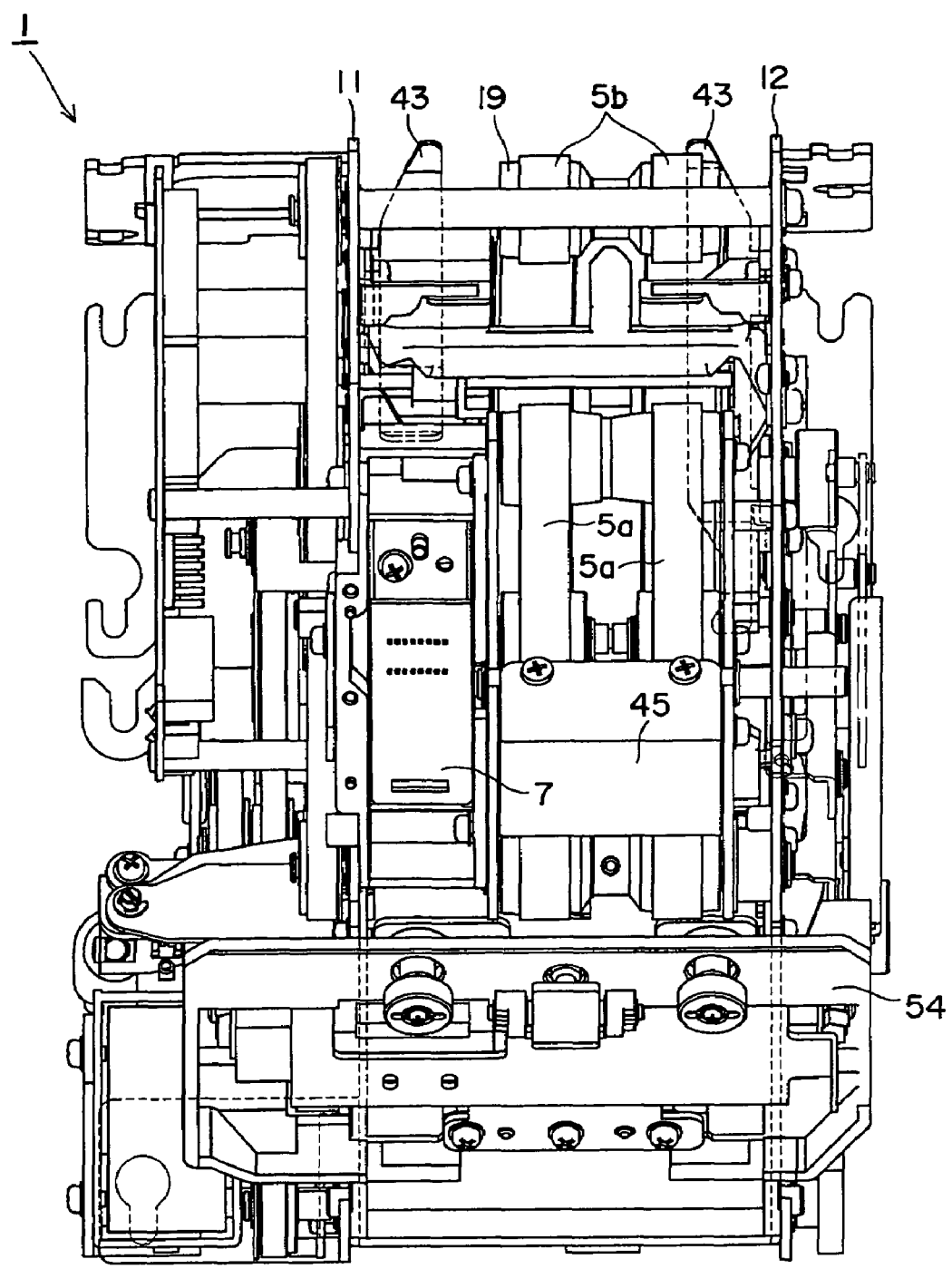
FIG. 7 is a plan view showing the magnetic information medium recording/reproducing device.
Figure 8:
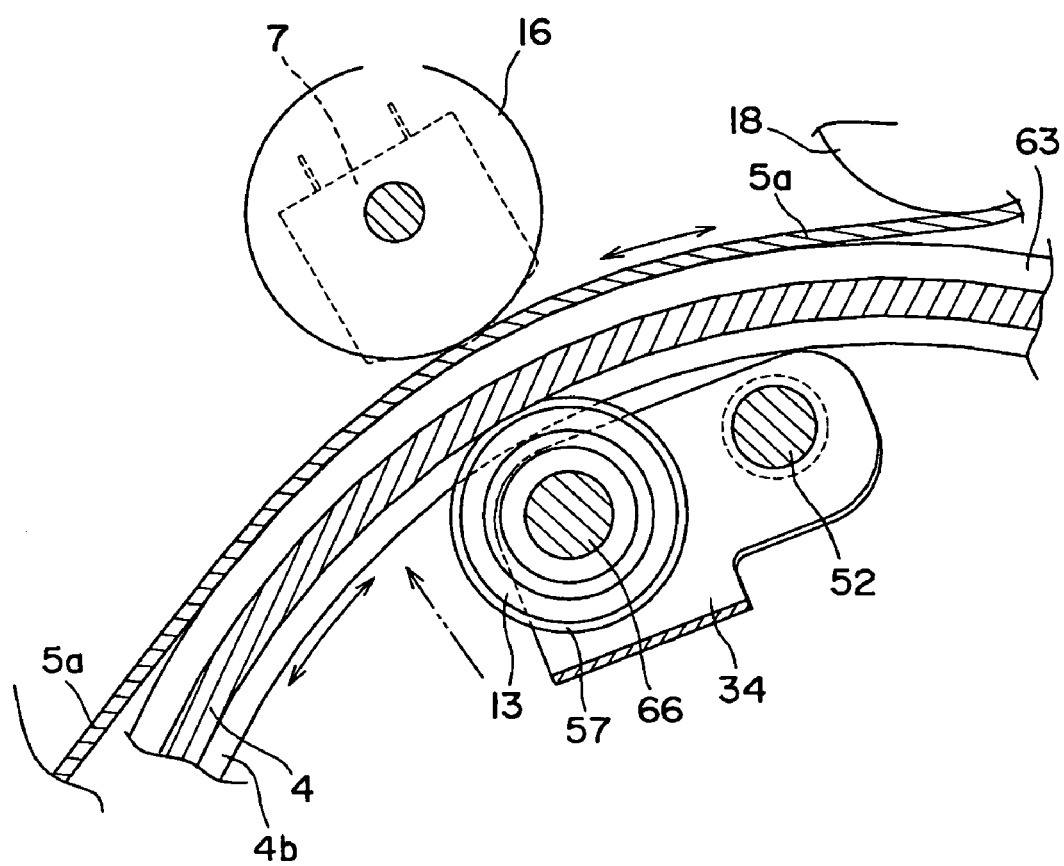
FIG. 8 is an enlarged explanatory view showing a drum which is held by an outer roller and an inner support roller in the magnetic information medium recording/reproducing device shown in FIG. 3.
Figure 9:
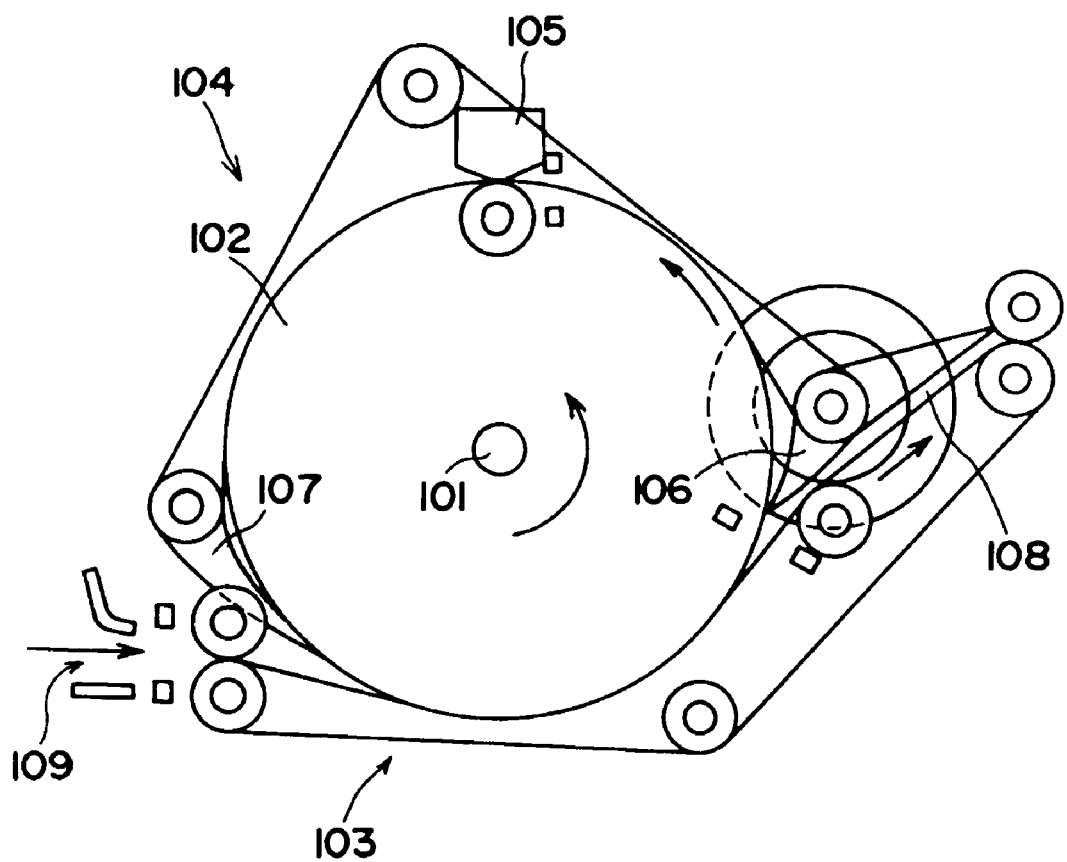
FIG. 9 is a schematic view showing a drum type of conventional magnetic information medium recording/reproducing device.

On the other hand, the portions 53c of the motor mounting plate 53 for mounting the lower support shafts 52 (support shafts for supporting the inner support roller 14, 15) are slightly bent on the opposite side of the mainframe 12 in FIG. 5 (front side direction with respect to the paper surface in FIG. 6). In accordance with an embodiment, the rigidity of the motor mounting plate 53 is partially reduced by forming an elongated through hole 53a in the motor mounting plate 53 to be capable of easily bending the motor mounting plate 53 along a bending line 53b (see FIG. 6).

The inner support roller 13 is supported by a shaft 66 mounted on a support arm 34 which is swingable around the support shaft 52. For example, one end portion of a twisted coil spring mounted on the support shaft 52 is engaged with the motor mounting plate 53 by utilizing the through hole 53a of the motor mounting plate 53 and the other end portion of the twisted coil spring is engaged with the tip end portion of the support arm 34. Therefore, the support arm 34 is provided so as to continuously urge the drum 4 toward the outer roller 16.

As described above, the brackets 51 on the mainframe 12 side and the corresponding portions 53c of the motor mounting plate 53 which support the support shafts are inclined at the same angle so as to be in parallel to each other. Therefore, the respective support shafts 52 supported between the brackets 51 and the portions 53c, and the respective inner support rollers 13, 14, 15 supported by the support shafts 52 are slightly inclined and thus the drum 4 is rotatably supported in the state that the drum 4 is slightly tilted (1° (one degree) in this embodiment) in a prescribed direction. In other words, the inner support rollers 13, 14, 15 and the drum 4 are mounted so as to be slightly inclined with respect to the direction perpendicular to the surface of the mainframes 11, 12.

The feeding mechanism 5 is oppositely disposed to the outer peripheral face of the drum 4 to carry a magnetic information medium along the outer peripheral face of the drum 4. In an embodiment, the feeding mechanism 5 utilizes three sets of flat belts.

Specifically, as shown in FIG. 2, three sets of circulating belts 5a, 5b, 5c made of rubber are disposed so as not to interfere with each other around the peripheral face of the drum 4. Each set of the respective feeding belts 5a, 5b, 5c is composed of two belts and respectively disposed so as to be arranged side by side across the center groove portion of the drum 4 in the front and back directions (in the rotation shaft direction) (see FIG. 5). The respective feeding belts 5a, 5b, 5c are stretched over the pulleys 17, 18, 19, 20, 21, 22, 23 such that the face on the drum side is pressed against the outer peripheral face of the drum 4 at a prescribed pressure. The outer roller 16 is disposed on the halfway of the belt 5 which faces the movable inner support roller 13 and the belt 5 is traveled along the outer peripheral face of the drum 4 by the outer roller 16.

The flappers 24, 25 are provided as a switching means for taking a magnetic information medium into the medium feeding path 3 and for changing the feeding direction of the magnetic information medium which is carried through the medium feeding path 3. The flapper 24 is disposed between the belt 5b and the belt 5c to change the feeding direction of the magnetic information medium depending on the feeding direction of the magnetic information medium. In other words, when a magnetic information medium is carried in a counterclockwise direction for collation working, the flapper 24 is moved on the drum 4 side and the magnetic information medium after collation is performed is sent to the outlet port 30. When the magnetic information medium is carried in a clockwise direction, the flapper 24 is moved away from the drum 4 and forms a part of the medium feeding path along the outer peripheral face of the drum 4 and the magnetic information medium is carried from the feeding belt 5b to the feeding belt 5c (see FIGS. 2 and 3).

The flapper 25 is disposed between the belt 5a and the belt 5c, and its position is changed depending on the situation of a carried magnetic information medium. In other words, the flapper 25 ensures the medium feeding path 3 of a magnetic information medium by means of that the flapper 25 is moved close to the drum 4 when a magnetic information medium is taken into from either of the first intake port 27 through the third intake port 29 and carried to the drum 4. Further, when the magnetic information medium which is taken in is carried around the drum 4, the flapper 25 ensures the medium feeding path 3 by means of that the flapper 25 is moved apart from the drum 4 to prevent the magnetic information medium from returning to the intake passage and guide it to the third feeding belt 5c along the drum 4 (see FIGS. 2 and 3).

As described above, in accordance with an embodiment, for example, as shown in FIG. 5, the drum 4 is arranged so as to be slightly tilted. In other words, at least at upper stream portion with respect to the magnetic head 7 in the case that a magnetic information medium is taken into the medium feeding path 3, it is preferable that the shaft 9 of the drum 4 is slightly tilted such that the space width between the drum 4 and the feeding belt 5a becomes narrower according to the position away from the magnetic head 7.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic information medium recording/reproducing device comprising:
    a drum whose outer peripheral face forms a medium feeding path for a magnetic information medium and which is turnably supported on a frame, the drum being formed in a hollow cylindrical shape having an inner peripheral wall;
    a feeding mechanism which is disposed on the frame so as to face the outer peripheral face of the drum for carrying the magnetic information medium along the outer peripheral face of the drum while pressing the magnetic information medium against the outer peripheral face of the drum;
    a driving part which drives the feeding mechanism;
    a magnetic head which is disposed at a position which is capable of facing a magnetic recording part of the magnetic information medium;
    an outer roller which is disposed on an outer peripheral side of the drum and receives an urging force of the urged inner support roller; and
    a pad roller which presses the magnetic recording part of the magnetic information medium to the magnetic head; and
    a plurality of inner support rollers which are disposed for supporting the drum from the inner peripheral wall side of the drum;
    wherein the drum is held by the inner support rollers and the feeding mechanism, and one of the inner support rollers is disposed near the magnetic head and is urged against the inner peripheral wall of the drum as an urged inner support roller; and
    wherein the urged inner support roller and the outer roller, and the magnetic head and the pad roller are respectively disposed side by side in a width direction of the magnetic information medium.

2. The magnetic information medium recording/reproducing device according to claim 1, wherein the inner support rollers are disposed on an inner side of the inner peripheral wall of the drum at a roughly equal interval and the remaining inner support rollers except the urged inner support roller are fixed.

3. The magnetic information medium recording/reproducing device according to claim 1, wherein a protruded part is formed on the inner peripheral wall of the drum and the plurality of the inner support rollers are formed with a groove part which fits with the protruded part.

4. The magnetic information medium recording/reproducing device according to claim 1, wherein a drive motor is disposed in an inside space of the drum.

5. The magnetic information medium recording/reproducing device according to claim 1, wherein the drum is a resin molded product.

6. A magnetic information medium recording/reproducing device comprising:

a drum whose outer peripheral face forms a medium feeding path for a magnetic information medium and which is turnably supported on a frame, the drum being formed in a hollow cylindrical shape having an inner peripheral wall;

a feeding mechanism which is disposed on the frame so as to face the outer peripheral face of the drum for carrying the magnetic information medium along the outer peripheral face of the drum while pressing the magnetic information medium against the outer peripheral face of the drum;

a driving part which drives the feeding mechanism;

a magnetic head which is disposed at a position which is capable of facing a magnetic recording part of the magnetic information medium; and a plurality of inner support rollers which are disposed for supporting the drum from the inner peripheral wall side of the drum;

wherein the drum is held by the inner support rollers and the feeding mechanism, and one of the inner support rollers is disposed near the magnetic head and is urged against the inner peripheral wall of the drum as an urged inner support roller; and wherein the drum and the magnetic head are inclined with respect to the frame such that difference of pressure pressing the magnetic information medium between the drum and the feeding mechanism near the magnetic head generates a lateral force toward the magnetic head side.

7. The magnetic information medium recording/reproducing device according to claim 6, wherein the inner support rollers are disposed on an inner side of the inner peripheral wall of the drum at a roughly equal interval and the remaining inner support rollers except the urged inner support roller are fixed.

8. The magnetic information medium recording/reproducing device according to claim 6, wherein a protruded part is formed on the inner peripheral wall of the drum and the plurality of the inner support rollers are formed with a groove part which fits with the protruded part.

9. The magnetic information medium recording/reproducing device according to claim 6, wherein a drive motor is disposed in an inside space of the drum.

10. The magnetic information medium recording/reproducing device according to claim 6, wherein the drum is a resin molded product.

11. A magnetic information medium recording/reproducing device comprising:

a turnable drum whose outer peripheral face forms a medium feeding path for a magnetic information medium;

a feeding mechanism which is disposed so as to face the outer peripheral face of the drum for carrying the magnetic information medium along the outer peripheral face of the drum;

a magnetic head which is disposed at a position which is capable of facing a magnetic recording part of the magnetic information medium; and a medium feeding reference surface which is a stopper provided on one side of the medium feeding path such that a side edge part in a feeding direction of the magnetic information medium contacts with the stopper and serves as a reference position for the magnetic recording part of the magnetic information medium with respect to the magnetic head;

wherein the drum is relatively inclined with respect to another portion in a direction that a space width between the drum and the feeding mechanism becomes wider or that a pressure between the drum and the feeding mechanism is reduced near the magnetic head so that a force toward the magnetic head side is applied to the magnetic information medium.

12. The magnetic information medium recording/reproducing device according to claim 11, wherein the magnetic head is inclined at a substantially same angle as the drum so as to be in parallel to the drum.

13. The magnetic information medium recording/reproducing device according to claim 11, further comprising another magnetic head which is disposed at a point symmetrical position with respect to the magnetic head with a center position of the drum as a symmetrical center.

* * * * *